Nov. 26, 1957  W. F. HUNICKE  2,814,149

FISHING LURE

Filed Feb. 7, 1955

William F. Hunicke
INVENTOR.

BY
Attorneys

United States Patent Office 2,814,149
Patented Nov. 26, 1957

2,814,149

FISHING LURE

William F. Hunicke, Conover, N. C.

Application February 7, 1955, Serial No. 486,634

4 Claims. (Cl. 43—42.41)

This invention relates in general to new and useful improvements in fishing equipment, and more specifically, to an improved fishing lure.

In order for a fishing lure to be effective, it should simulate the particular food of the fish which the fisherman hopes to catch, and the hooks thereof must be so that there is little possibility of the lure being caught in rocks or trash which may be in the water. It is therefore the primary object of this invention to provide an improved fish lure which simulates a minnow in appearance and at the same time, is so constructed whereby the hooks thereof are not exposed so as to be of the weedless type.

Another object of this invention is to provide an improved fishing lure which is so constructed whereby the hooks thereof become exposed only when a fish bites upon the lure, the biting action of the fish on the lure resulting in the projecting of the hooks while the lure is in the fish's mouth so that the hooking of the fish is assured.

A further object of this invention is to provide an improved fishing lure which includes a body simulating a minnow and which has pivotally carried thereby a plurality of hooks, the hooks being so mounted whereby fins of the lure, when engaged by a fish biting upon the lure, will effect the projecting of the hooks into operative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
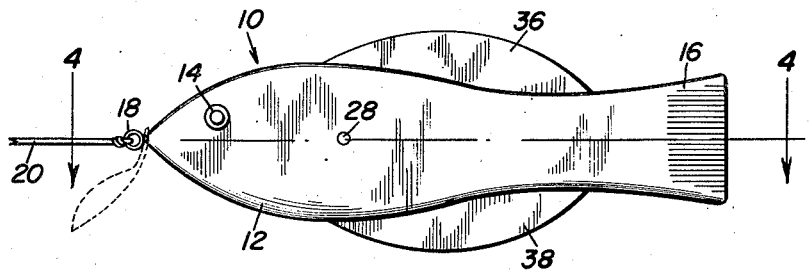
Figure 1 is a side elevational view of the fishing lure which is the subject of this invention and shows the general details thereof as it would appear when being pulled through the water.
Figure 2:
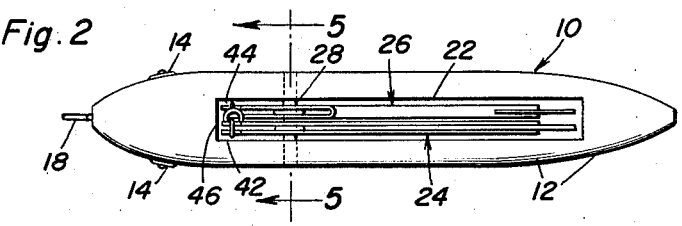
Figure 2 is a top plan view of the fishing lure of Figure 1 and shows the general details of a slot extending through the body thereof and the arrangement of fins and hooks therein.
Figure 4:
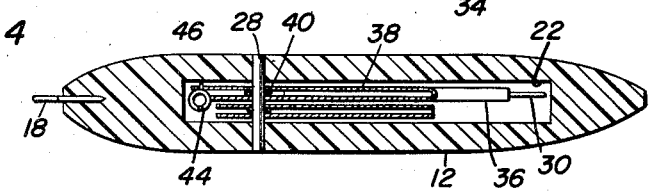
Figure 5:
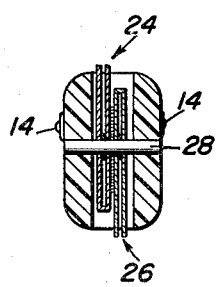

Figure 4 is a horizontal longitudinal sectional view taken substantially upon the plane indicated by the section line 4—4 of Figure 1 and further shows the details of the fins and hooks with relationship to the body of the fish lure; and Figure 5 is a transverse vertical sectional view taken substantially upon the plane indicated by the section line 5—5 of Figure 2 and shows the manner in which the fins and hooks are pivotally mounted with respect to the body.

Referring now to the drawings in detail, it will be seen that there is illustrated the fishing lure which is the subject of this invention, the fishing lure being referred to in general by the reference numeral 10. The fishing lure 10 includes an elongated body 12 which simulates a minnow. The body 12 is provided at its forward end with eyes 14 and at its trailing end with a tail 16. The nose of the body 12 is provided with an eye 18 to which a fishing line 20 may be conveniently connected.

The body 12 is provided with a generally rectangular cross-sectional longitudinally elongated slot 22 which extends entirely through the body 12 and opens through the upper and lower sides thereof. Mounted within the slot 22 are hook assemblies 24 and 26. The hook assemblies 24 and 26 are pivotally mounted on a transverse pivot pin 28 carried by the body 12.

Figure 3:
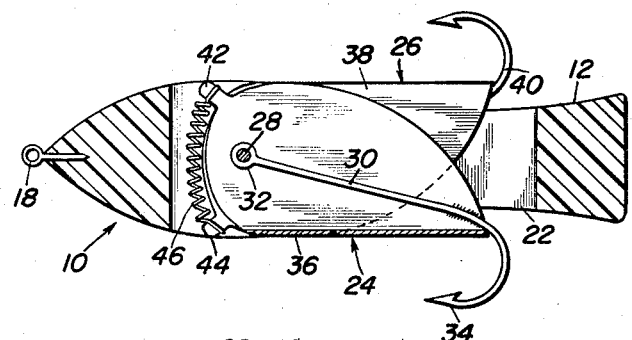
Figure 3 is a longitudinal vertical sectional view taken through the center of the fishing lure and shows the manner in which the fins and hooks are pivotally mounted therein, the hooks being shown in their projected positions.

As is best illustrated in Figure 3, the hook assembly 24 includes a hook 30 having an eye 32 pivotally carried by the pivot pin 28. The hook 30 also includes a barb portion 34 which is normally disposed within the confines of the body 12. Surrounding the shank and eye of the hook 30 is a fin 36. The fin 36 is preferably formed of material doubled upon itself to encase the shank and eye 32. The fin 36 is rigidly secured to the hook 30 and is pivotally carried by the pivot pin 28.

The hook assembly 26 is of a similar construction to the hook assembly 24 and includes a fin 38 and a hook 40. The fin 38 and the hook 40 are connected together and are pivotally mounted on the pivot pin 28 in the same manner as the hook 30 and fin 36.

The fin 36 has projecting forwardly therefrom an ear 42. The ear 42 is normally disposed adjacent an ear 44 of the fin 38. Extending between the ears 42 and 44 and connected thereto is a coil spring 46 which retains the fins 36 and 38 in the projected positions of Figure 1 and the hooks 30 and 40 in their retracted positions.

When the lure 10 is cast, it has that appearance illustrated in Figure 1. Inasmuch as the hooks 30 and 40 are disposed within the body 12, it is readily apparent that the lure cannot snag on the surrounding trees or other obstacle when the cast is made. Also, when the lure 10 is in the water and is being drawn therethrough, it actually simulates a minnow and is more attractive to fish. Inasmuch as the hooks 30 and 40 are normally within the body 12, it will be readily apparent that the lure cannot become snagged on rocks or weeds.

When a fish bites upon the lure 10, it will engage the fins 36 and 38, causing the fins 36 and 38 to move towards each other against the urging of the spring 46 and project the hooks 30 and 40. This will assure the snagging of the fish on the hooks 30 and 40.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing lure comprising a body simulating a bait size fish, said body having a vertically disposed longitudinally extending slot, said slot opening through upper and lower surfaces of said body, hooks pivotally connected to said body and disposed within said slot, means connected to said hooks for projecting said hooks from said body upon biting of said body by a fish, said means being in the form of fins carrying said hooks and pivotally secured to said body, said fins normally projecting from said slot, and spring means interconnecting said fins and resiliently urging a portion of said fins apart.

2. A fishing lure comprising a body simulating a bait size fish, said body having a vertically disposed longitudinally extending slot, said slot opening through upper and lower surfaces of said body, fin simulating members partially disposed within said body in said slot and projecting above and below said body, a pivot pin carried by said body, said pivot pin extending transversely of said slot, said fin simulating members being pivotally mounted on said pivot pin, a hook carried by each of said fin simulating members for movement therewith, and spring means normally urging a portion of said fin simulating members outwardly of said body and retaining said hooks within said body.

3. A fishing lure comprising a body simulating a bait size fish, said body having a vertically disposed longitudinally extending slot, said slot opening through upper and lower surfaces of said body, fin simulating members partially disposed within said body in said slot and projecting above and below said body, a pivot pin carried by said body, said pivot pin extending transversely of said slot, said fin simulating members being pivotally mounted on said pivot pin, a hook carried by each of said fin simulating members for movement therewith, and spring means normally urging a portion of said fin simulating members outwardly of said body and retaining said hooks within said body, said hooks each including an eye, said eye receiving said pivot pin.

4. A fishing lure comprising a body simulating a bait size fish, said body having a vertically disposed longitudinally extending slot, said slot opening through upper and lower surfaces of said body, fin simulating members partially disposed within said body in said slot and projecting above and below said body, a pivot pin carried by said body, said pivot pin extending transversely of said slot, said fin simulating members being pivotally mounted on said pivot pin, a hook carried by each of said fin simulating members for movement therewith, and spring means normally urging a portion of said fin simulating members outwardly of said body and retaining said hooks within said body, said hooks each including an eye, said eye receiving said pivot pin, said spring means extending between and interconnecting said fin simulating members.

References Cited in the file of this patent
UNITED STATES PATENTS

| | | |
|---|---|---|
| 906,519 | Fischer | Dec. 15, 1908 |
| 1,920,991 | Lahm | Aug. 8, 1933 |
| 1,959,911 | Fogelson | May 22, 1934 |
| 2,326,620 | Charpentier | Aug. 10, 1943 |
| 2,396,366 | Forbess | Mar. 12, 1946 |